US012391053B2

(12) United States Patent
Dafinoiu et al.

(10) Patent No.: US 12,391,053 B2
(45) Date of Patent: Aug. 19, 2025

(54) PRINTHEAD MONITORING

(71) Applicant: Hewlett-Packard Development Company, L.P., Spring, TX (US)

(72) Inventors: Andrei Alexandru Dafinoiu, Sant Cugat del Valles (ES); Andreu Vinets Alonso, Sant Cugat del Valles (ES); David Toussaint, Sant Cugat del Valles (ES)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 126 days.

(21) Appl. No.: 18/005,402

(22) PCT Filed: Jul. 14, 2020

(86) PCT No.: PCT/US2020/041909
§ 371 (c)(1),
(2) Date: Jan. 13, 2023

(87) PCT Pub. No.: WO2022/015288
PCT Pub. Date: Jan. 20, 2022

(65) Prior Publication Data

US 2023/0321995 A1 Oct. 12, 2023

(51) Int. Cl.
*B41J 2/21* (2006.01)

(52) U.S. Cl.
CPC .................................. *B41J 2/2142* (2013.01)

(58) Field of Classification Search
CPC .... B41J 2/2142; B41J 2/04536; B41J 29/393; B41J 2/16579; B41J 2/0451; B41J 2/2139
See application file for complete search history.

(56) References Cited

U.S. PATENT DOCUMENTS

| | | | |
|---|---|---|---|
| 6,447,091 | B1 | 9/2002 | Calvo et al. |
| 6,692,099 | B2 | 2/2004 | Rio Doval |
| 7,287,824 | B2 | 10/2007 | Subirada et al. |
| 7,984,959 | B2 | 7/2011 | Devore et al. |
| 8,388,098 | B2 | 3/2013 | Govyadinov et al. |

FOREIGN PATENT DOCUMENTS

| | | | |
|---|---|---|---|
| EP | 1147900 | A1 | 10/2001 |
| EP | 1308286 | A1 | 5/2003 |
| EP | 1577108 | A2 | 9/2005 |
| EP | 1188565 | B1 | 11/2005 |

*Primary Examiner* — Jannelle M Lebron
(74) *Attorney, Agent, or Firm* — Jordan IP Law, LLC

(57) ABSTRACT

Examples relate to a computer implemented method comprising, based on a vulnerable nozzle map indicating one or more operational nozzles of a printhead identified as meeting a failure likelihood criterion, during a print job, and between successive print passes of the printhead, checking operation of the one or more operational nozzles indicated on the vulnerable nozzle map.

14 Claims, 6 Drawing Sheets

PRINTHEAD MONITORING

BACKGROUND

Printing may be performed using a printhead with nozzles through which printing liquid is emitted onto a substrate or medium. Nozzles may fail to operate, for example to due to clogging.

BRIEF INTRODUCTION OF THE DRAWINGS

Example implementations are described below with reference to the accompanying drawings, in which.

DETAILED DESCRIPTION

Figure 1:
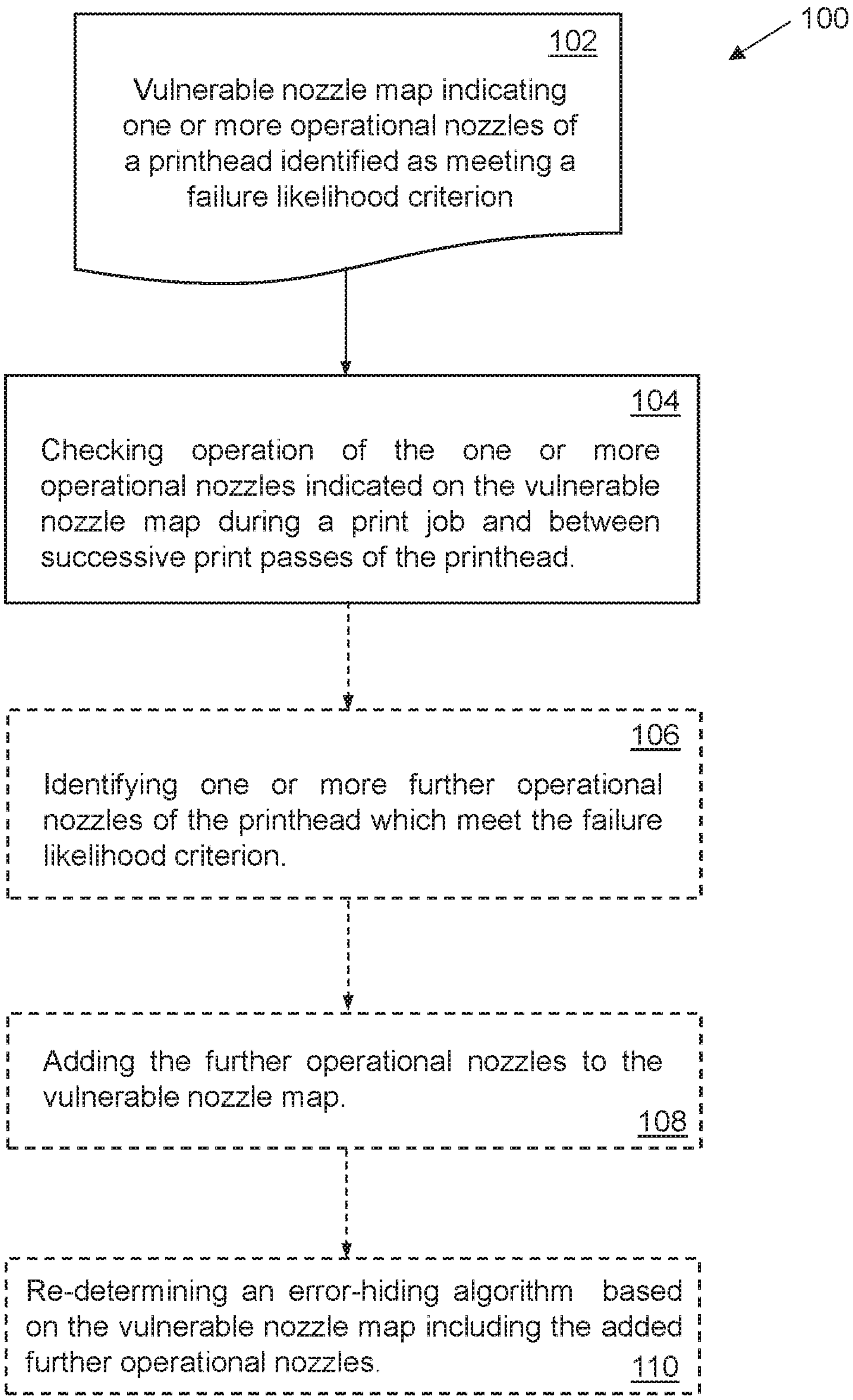
FIG. 1 shows methods for checking nozzle operation according to some examples.

Certain printing methods involve ejecting printing liquid from a series of nozzles onto a substrate to print an image/design.

Some printing applications involve printing on large amounts of material, in some cases in a short amount of time. Such printing operations may benefit from unattended printing wherein printing can take place without human oversight or intervention of the printing process. For example, in dye-sublimation printing, a single print job/run may involve printing on around 1000 linear metres of substrate. In such examples the user may wish to run the printer non-stop, ideally without supervision, while the print run takes place.

To improve print quality and reliability of running a print job; and reduce any need for user intervention or monitoring during printing, in particular for long print runs (e.g. several hours), systems and workflows may be used to improve media/substrate control, printing liquid/ink delivery control, carriage moment, and others. However, systems to monitor printhead heath are engaged outside printing time. For example, a drop detection routine, whereby nozzles of the printhead are tested to check whether they are emitting printing fluid correctly, or whether they are misfiring or blocked/clogged, may take place either before a print job/run (prior to any of the image being printed) or after a print job/run (after printing is completed and the whole image has been printed). As such, any nozzle failures which may affect print quality may be detected after a print run has finished. However, if the failure occurs during the print run, it may undesirably result in a visible print defect in the printed item.

Such drop detection routines (or other methods for checking nozzle operation) may be performed for all nozzles of a printhead, which takes an amount of time which is too long to feasibly allow such a drop detection (or similar) routine to be performed during a print run. For example, it may take around 80 seconds for a drop detection routine for all nozzles of a printhead, and adding this time to the print run time makes the overall time for the print run to complete impractically long. Further, drop detection routines may check nozzles and categorise each nozzle as either operational (firing, on) or not operational (missing, off) without any further or intermediate categorisation of the nozzles.

It may be desirable to monitor the health/operation of nozzles of a print head during a print run so that action may be taken to correct any errors in nozzle operation during the print run. It may be desirable to perform such nozzle monitoring, and any subsequent error correction, in a way which does not take additional time over the time to perform the print run. It may be desirable to categorise nozzles in further categories to "on" or "off", for example to allow for different ways of managing nozzle operation to achieve acceptable print quality.

Examples disclosed herein may allow for nozzle operation to be monitored during a print run without introducing delay. Examples disclosed herein may allow for nozzle operation to be categorised to allow for a reduction on the number of nozzles to be evaluated to ensure sufficient monitoring during a print run. Certain examples disclosed herein combine a grading algorithm (using a categorisation of nozzle health, to select a number of nozzles for monitoring less than the total number), and a control function to enable rapid nozzle monitoring during printing without introducing delays to the print flow. Nozzle monitoring may be performed, for example, by drop detection, or based on light emitting and light receiving components detecting the emission of printing fluid from the nozzle. Nozzle monitoring may also be done using other methods, such as using image patterns or determine whether nozzles are functioning.

The term "vulnerable nozzle" may be taken to mean a nozzle which is operational, i.e. is ejecting/performing the deposition of printing fluid to a satisfactory standard, i.e. it deposits printing fluid in a way which at least meets a printing quality threshold. However, the vulnerable nozzle also at least meets a threshold for expected printing error, i.e. it meets a failure likelihood criterion. Thus, if a vulnerable nozzle were to stop operating and become a non-functional nozzle, e.g. due to clogging of that nozzle, then the resulting print quality of the printed item would not meet an acceptable printing quality threshold. This may be because, for example, the vulnerable nozzle is immediately adjacent to a non-functioning nozzle—while the one non-functioning nozzle can be compensated for so the resulting printed item meets a quality criterion, if the vulnerable nozzle were also to fail, then the resulting printed item would be of lower print quality and thus not meet the quality criterion.

Since it is functional, but vulnerable nozzles, which are monitored by the online monitoring process disclosed herein, the nozzle map of vulnerable nozzles indicates nozzles that are printing properly, but which, if they fail, may cause an unacceptable print quality deterioration (e.g. such as a region of the substrate which should have printing liquid deposited thereon/therein, but which does not as the nozzles which should deposit printing liquid in that region are not operational nor compensated for by other operational nozzles). Other methods of checking print operation of printing nozzles may instead focus on nozzles which are "out"/non-functioning, which are weak (not enough printing liquid is being dispensed by the nozzle) or which are misdirected nozzles (the printing liquid emitted is not deposited in the desired region of the substrate)—that is, nozzles which are not operating satisfactorily.

Figure 2:
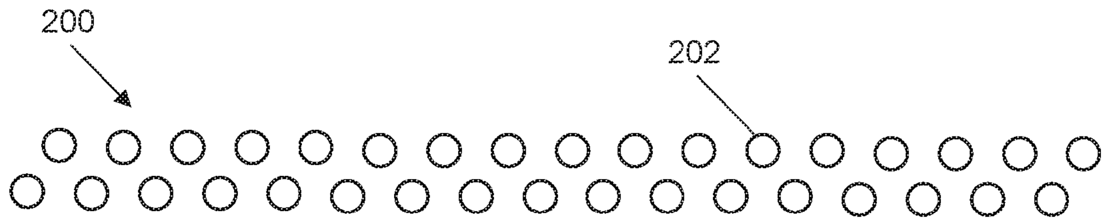
FIG. 2 illustrates an example of a portion of a printhead with no vulnerable nozzles according to some examples.

FIG. 1 shows a method 100 for monitoring printhead nozzle operation according to some examples. The method uses a vulnerable nozzle map which indicates one or more operational nozzles of a printhead identified as meeting a failure likelihood criterion 102. In some examples the method may comprise determining the vulnerable nozzle map. In some examples, the vulnerable nozzle map is predetermined and used as input to the method 100. An example vulnerable nozzle map is illustrated in FIG. 2.

Based on the vulnerable nozzle map, and during a print job and between successive print passes of the printhead, the method comprises checking operation of the one or more operational nozzles indicated on the vulnerable nozzle map 104. Checking operation of the vulnerable nozzles may comprise, for example, performing drop detection of the one or more operational nozzles indicated in the vulnerable nozzle map, and/or any suitable method for verifying that the vulnerable nozzles are satisfactorily operational.

Because the number of vulnerable nozzles may be less (in some examples, much less, e.g. less than 10%, or 5%, of all the nozzles) than the total number of nozzles of the printhead, it is possible to check the operation of those operational nozzles indicated on the vulnerable nozzle map during a print job and between successive print passes of the printhead without introducing delays in the print process compared to performing the same print job without any nozzle checks. That is, performing the print job including checking the operation of the one or more operational nozzles indicated on the vulnerable nozzle map takes substantially the same time as performing an equivalent print job performed without checking the operation of one or more operational nozzles. In other words, a print job to print a printed image which includes checking the operation of the nozzles indicated on the vulnerable nozzle map, between print passes of the print head during the print run, may take substantially the same time to complete as an equivalent print job producing an equivalent printed image performed without checking the operation of the one or more operational nozzles indicated on the vulnerable nozzle map as claimed.

In some examples, the method may comprise, following checking the operation of the one or more operational nozzles 104, identifying one or more further operational nozzles of the printhead which meet the failure likelihood criterion 106, and adding the further operational nozzles to the vulnerable nozzle map 106. That is, after a check of the vulnerable nozzles, one or more further nozzles may be identified as vulnerable and thus may be added to the vulnerable nozzle map to update the map (or in some examples create a new vulnerable nozzle map). One or more nozzles may be identified as vulnerable by, for example, identifying one or more nozzles indicated as vulnerable on the vulnerable nozzle map as non-functioning nozzles, and re-determining which nozzles of the printhead now qualify as meeting the failure likelihood criterion and are thus vulnerable, based on the newly identified, previously vulnerable yet operational, but now non-functioning, nozzles.

In some examples, the method may comprise re-determining an error-hiding algorithm based on the vulnerable nozzle map including the added further operational (but now vulnerable) nozzles 110. The error-hiding algorithm is to select nozzles, e.g. for use in printing, and/or for omission from use in printing, to provide a reduction of printing errors due to non-functional nozzles. For example, an error-hiding algorithm may replace a non-functional nozzle with a functional one by identifying that a functional nozzle passes over the empty space of the substrate which has been left by the non-functioning nozzle. A secondary printhead of the same colorant located in a different position of the carriage may then be instructed to fire (emit printing fluid) using its functional nozzle which overlaps with the space left by the non-functional nozzle. This may be either in the same print pass or a secondary print pass. This may be achieved by shifting the firing region of the printhead from one non-functional nozzle to another functional one, for example.

Figure 3:
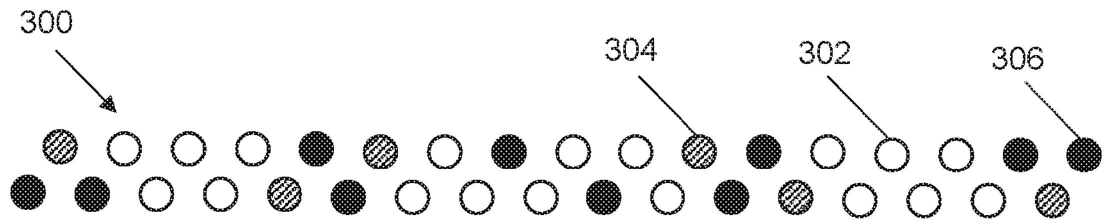
FIG. 3 illustrates an example of a portion of a printhead with vulnerable nozzles according to some examples.

FIGS. 2 and 3 illustrate examples of portions 200, 300 of a print head. In FIG. 2 all the nozzles 202 are operational, no nozzles are non-operational, and no nozzles are vulnerable. This printhead portion 200 may, for example, represent a black/K trench of a printhead in which all the nozzles are operational 212.

In FIG. 3, the print head portion 300 comprises some vulnerable nozzles 304. This printhead portion 300 may be, for example, a cyan/C trench of the printhead. In this example, some of the nozzles are non-functioning 306. As a consequence, some operational nozzles are designated as being vulnerable nozzles 304. These vulnerable nozzles 304 are the nozzles which will be checked between print passes during the print job. Other nozzles are operational 302 and are not vulnerable. Such an illustration may be considered to be an example of a vulnerable nozzle map. In other examples, a vulnerable nozzle map may be a list of unique identifiers of each nozzle of the printhead, and an associated indicator or flag indicating if that nozzle is considered to be operational and non-vulnerable, vulnerable (and operational), or non-functioning/non-operational. Other examples of vulnerable nozzle maps may be envisaged.

In this example, vulnerable nozzles 304 are those which, if they were to fail, may result in a visible fault to be present in a printed image (e.g. a space or gap in the printed image). In this example also; the vulnerable nozzles 304 are those which are immediately neighbouring a threshold number (in this example, two) of non-functional nozzles 306. That is, it may be said that the vulnerable nozzles 304 in this example are those operational nozzles which at least meet the failure likelihood criterion of 1) if the nozzle were to become non-operational, it would cause a visible fault in a printed image, and 2) the nozzle is immediately neighbouring a threshold number (two) of non-functional nozzles.

Figure 4:
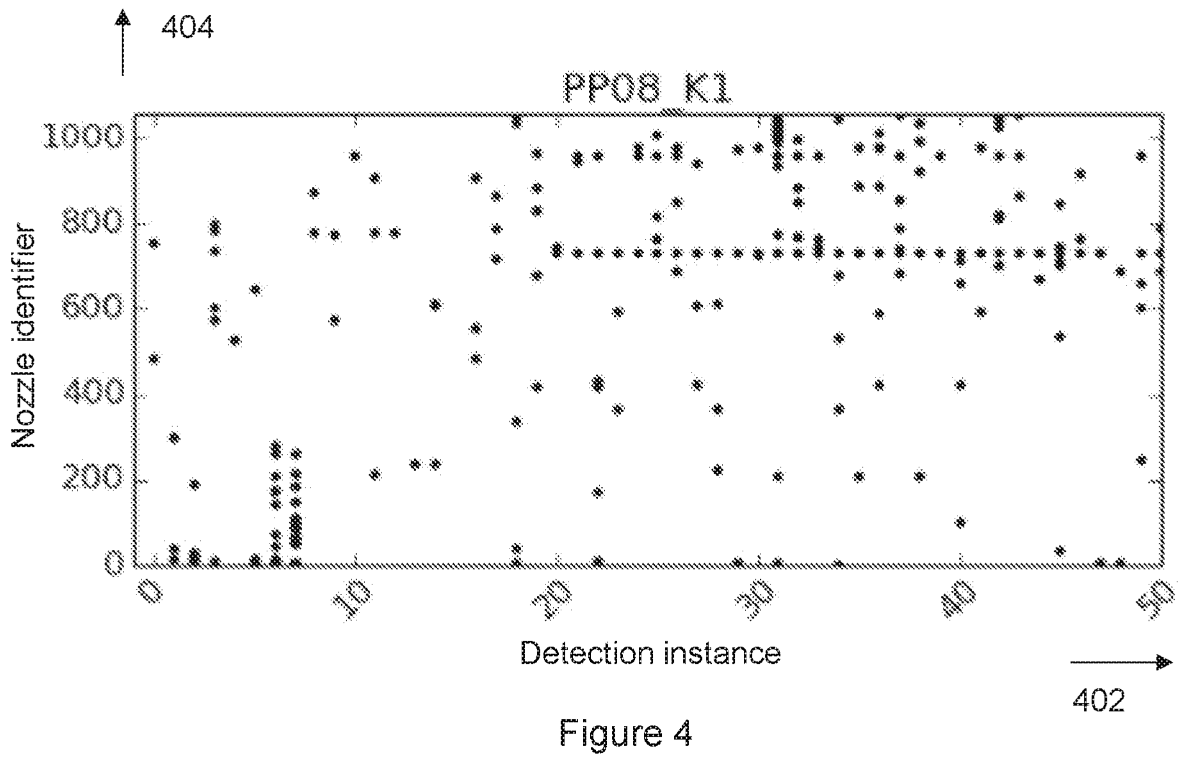
FIG. 4 depicts a nozzle map showing clogged nozzles according to some examples.

FIG. 4 depicts a nozzle map showing clogged nozzles. FIG. 4 illustrates a chart mapping the nozzle activity (operational or non-operational) of 1056 nozzles across multiple detections. For example, in FIG. 4 the x-axis 402 indicates the detection instance; in this example 50 detection tests were performed. The y-axis 404 indicates the nozzle number/identifier, A dot indicates that a nozzle has failed on that detection test. It can be seen that after around 20 detections; a nozzle around number 700 is sporadically failing (i.e. it ejects printing liquid in some tests but not in other tests); as shown by the line of "out" marks over tests 30 to 50 for that nozzle. If this nozzle fails to operate during a print run, it may cause a printing defect. This nozzle, therefore, may be marked as "vulnerable" to help timely detection of a nozzle failure, and possible action to correct the potential error before it occurs. In some examples; the detection of non-functionality of a previously operational (vulnerable) nozzle may trigger a nozzle recovery, or servicing routine. Such recovery actions may take place, for example, if an existing or adjusted error hiding strategies/algorithms are not able to compensate for the non-functioning nozzles to provide an acceptably good print quality.

Such a nozzle map may be used to determine whether a nozzle is failing to operate at a rate above a threshold nozzle operation rate. If, for example, a nozzle fails more than a predetermined number of times in a row (e.g. three times in a row), and/or a predetermined number of times out of a set number of attempts (e.g. four failures from ten attempts), then that nozzle may be marked as vulnerable.

Figure 5:
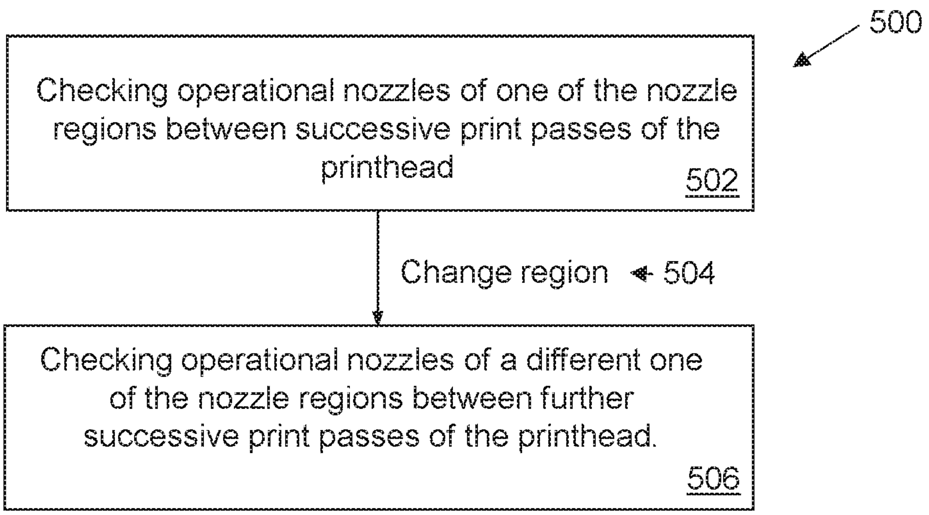
FIG. 5 shows an example of a method for checking nozzle operation according to some examples.

FIG. 5 shows an example of a method 500 for checking nozzle operation. A printhead may be nominally divided in a plurality of sections each containing one or more nozzles. An example is of dividing a four colour printhead into four regions—one cyan (C), one magenta (M), one yellow (Y) and one black (K). Another example is dividing a printhead of 1056 nozzles into four 264-nozzle regions by nozzle numbers 1-264, nozzles 265-528, nozzles 529-792 and nozzles 793-1056. Other examples may be envisaged.

FIG. 5 illustrates that in examples in which the printhead comprises a plurality of nozzle regions, checking the operation of the one or more operational nozzles identified as meeting the failure likelihood criterion may comprise checking operational nozzles (indicated on the vulnerable nozzle map) of one of the nozzle regions between successive print passes of the printhead 502; and checking operational nozzles (indicated on the vulnerable nozzle map) of a different one of the nozzle regions between further successive print passes of the printhead 504. For example, in a four colour printhead, the operation of the vulnerable nozzles in the cyan trench may be checked 502, then the region to be checked on the next print pass changes 504 to magenta, then operation of the vulnerable nozzles in the magenta trench may be checked 506 (of course this may continue to check the vulnerable nozzles in the yellow and black trenches as well, and then in some examples may cycle back to checking the vulnerable nozzles of the cyan trench again).

In some examples in which the printhead region varies for different vulnerable nozzle checks, checking the operational nozzles of one of the nozzle regions may comprise calculating a carriage stop position for the nozzle region at which the nozzle region is positioned to be checked. For example, the carriage stop position to check a magenta trench by e.g. drop detection by a drop detector sensor at one side of the substrate may be different to the carriage stop position to check a yellow, cyan or black trench by that drop detector sensor. Calculating the carriage stop position may comprise calculating the stop position of the carriage such that the nozzle region to be checked is aligned for operation with (e.g. on top of) the drop detector (or other detection element), and then executing the drop detection routine (or other testing routine) on that nozzle region.

Figure 6:
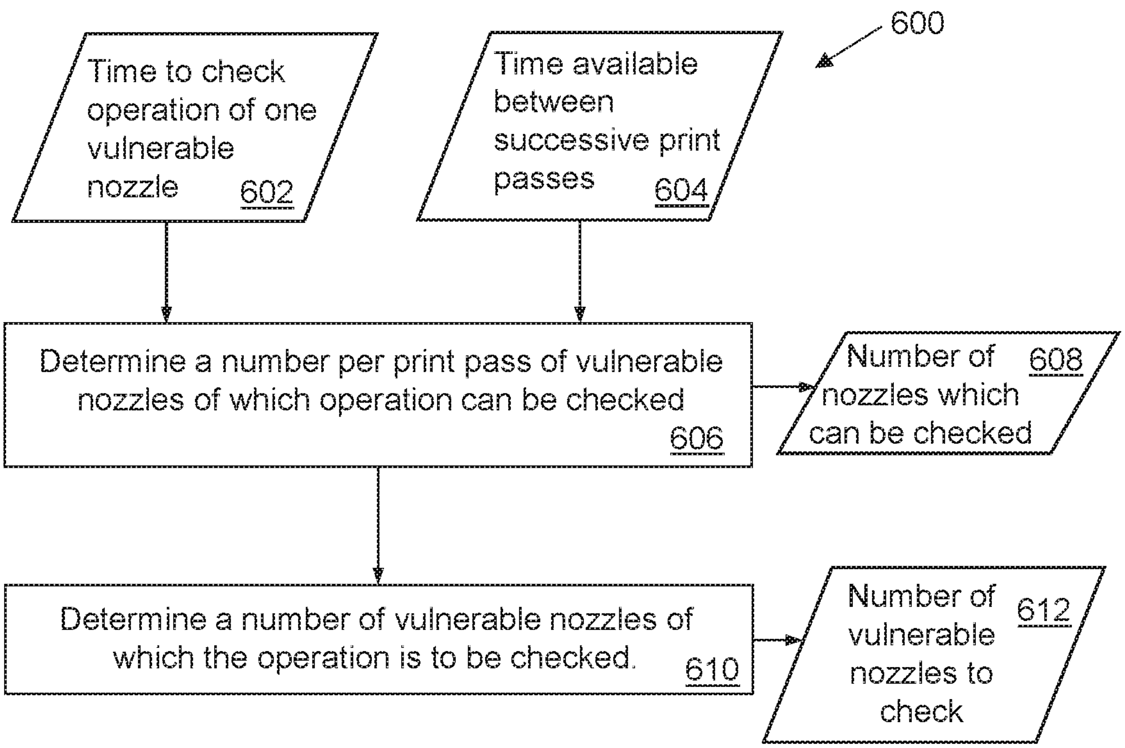
FIG. 6 illustrates a method for determining a number of nozzles to check according to some examples.

In some examples, the number of nozzles which can be checked in-between immediately successive print passes 608 may not be the same as the number of vulnerable nozzles which are indicated in the vulnerable nozzle map 612. Thus in some examples, as shown in FIG. 6, methods may comprise determining 606 a number per print pass of vulnerable nozzles of which operation can be checked 608. This value may be based on a time to check operation of one vulnerable nozzle 602 and a time available between successive print passes 604 (i.e. time available for nozzle operation checks). For example, the number per print pass of vulnerable nozzles of which operation can be checked 608 may be based on a time available between successive print passes 604 divided by a time to check operation of one vulnerable nozzle 602. Factors such as a time to initiate and/or terminate operation checking, a time to start and/or end movement of the printhead, and/or one or more other factors may be accounted for in determining a number per print pass of vulnerable nozzles of which operation can be checked 606. The method may also determine 610 a number of vulnerable nozzles of which the operation is to be checked 612, for example using the number of nozzles marked as vulnerable on the vulnerable nozzle map (e.g. for a particular region of the printhead to be checked), If the number of vulnerable nozzles of which the operation is to be checked 612 is not the same as the number per print pass of vulnerable nozzles of which operation can be checked 608, then further calculations/determinations may be performed, as shown in FIG. 7.

Figure 7:
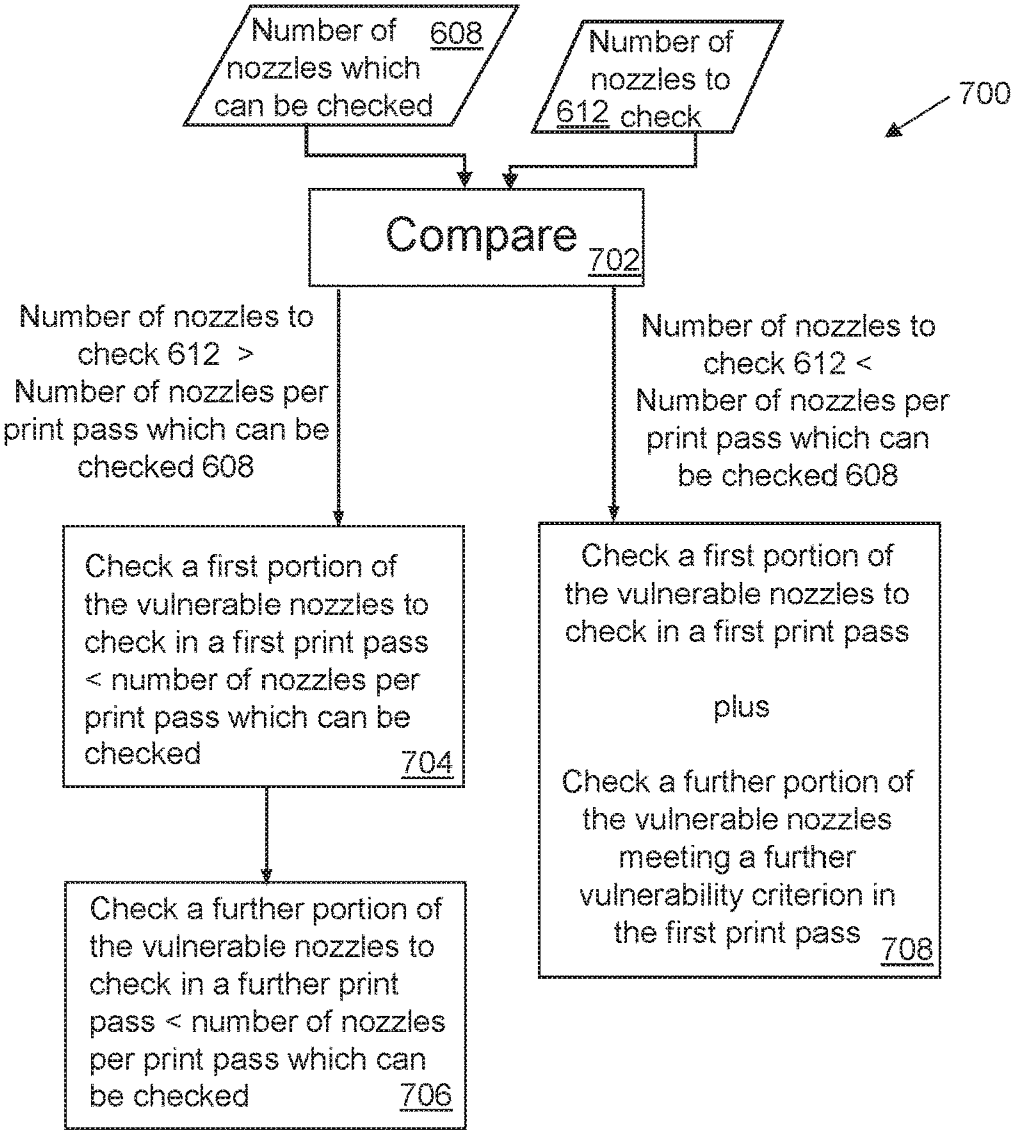
FIG. 7 shows a method for checking a number of nozzles according to some examples.

FIG. 7 shows a method 700 of using the determined number of nozzles which can be checked 608 (in a time between print head passes), and the number of vulnerable nozzles which are to be checked 612. These values are compared 702. If the number of vulnerable nozzles to check 612 is greater than the number per print pass of vulnerable nozzles 608 which can be checked, the method may check 704 a first portion of the vulnerable nozzles 612 in a first print pass, wherein the number of vulnerable nozzles 612 in the first portion does not exceed the number per print pass of vulnerable nozzles 602; and check 706 one or more further portions of the vulnerable nozzles 612 in one or more corresponding further print passes, wherein the number of vulnerable nozzles 612 in the each of one or more further portions also do not exceed the number per print pass of vulnerable nozzles 608. In this way all the vulnerable nozzles can still be checked without increasing the overall time for the print job to complete even though there are more nozzles to check than can be checked in-between two consecutive print passes.

If, on the other hand, the number of vulnerable nozzles 612 to be checked is less than the number per print pass of vulnerable nozzles 608 which can be checked, the method may check 708 a second number of one or more operational nozzles of the printhead identified as meeting a further failure likelihood criterion, which is lower than the failure likelihood criterion. For example, the first set of vulnerable nozzles may be categorised as vulnerable because they are operational but immediately neighbouring two non-functional nozzles. The second set of vulnerable nozzles which may be checked may then meet the lower failure likelihood criterion of neighbouring one non-functional nozzle. As another example, the first set of vulnerable nozzles may be categorised as vulnerable because they are operational but fewer than six out of ten times. The second set of vulnerable nozzles which may be checked may then meet the lower failure likelihood criterion of being operational but fewer than eight out of ten times. In this way, use is made of time available in-between two consecutive print passes to check nozzle operations by checking not only those nozzles identified as vulnerable 612 but also checking one or more other nozzles fulfilling a (different) vulnerability criterion.

Figure 8:
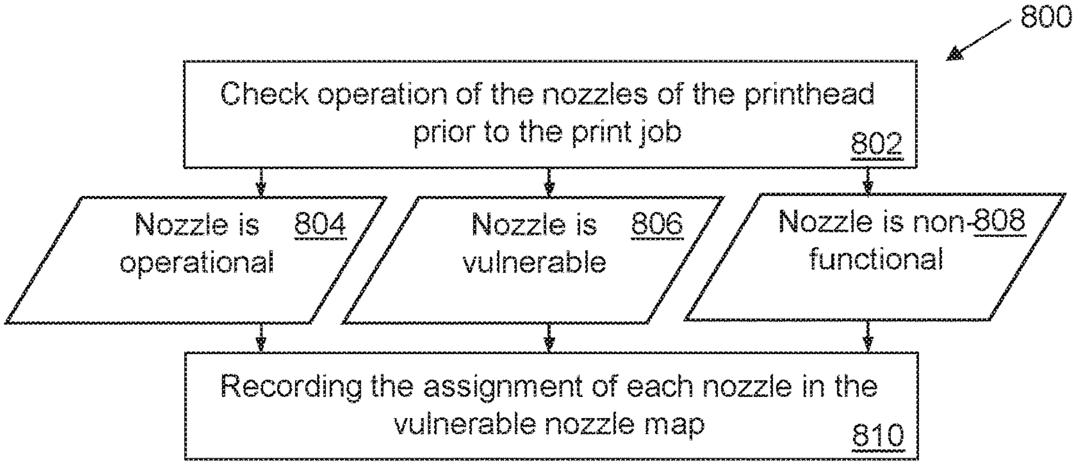
FIG. 8 illustrates a method for categorising nozzles according to some examples.

The method 800 of FIG. 8 illustrates generating the vulnerable nozzle map. In such examples, the vulnerable nozzle map may be generated by: checking operation of the nozzles of the printhead prior to the print job 802; and based on the checked operation of the nozzles, assigning each nozzle as: operational 804, whereby the nozzle ejects printing fluid and does not meet the failure likelihood criterion; vulnerable 806, whereby the nozzle ejects printing fluid and meets the failure likelihood criterion; or non-functional 808, wherein the nozzle does not eject printing fluid; and recording the assignment of each nozzle in the vulnerable nozzle map 810.

Checking operation of the nozzles of the printhead 802 may comprise, for example; determining one or more drop parameters for each checked nozzle. A drop parameter indicates a level of operability of the nozzle. The drop parameter may comprise, for example, one or more of: drop velocity (the velocity of the ink drop after being fired by the nozzle); fly time (which is a consequence of the drop velocity; and is the time between a nozzle firing a drop and the drop being detected on the drop detector); drop weight (the quantity of ink that forms the drop); drop size/drop volume (this parameter is relative to the drop weight, and may be evaluated by the signal interference that the drop generates on the drop detector signal); and drop trajectory (the direction in which ink is emitted; to check if a nozzle is misdirected or not).

The operation of the one or more operational nozzles indicated on the vulnerable nozzle map may be checked using a drop detection apparatus when the printhead is at a carriage stop position at a side of a print zone. This may be the case for the initial generation of the vulnerable nozzle map, a subsequent amendment of the vulnerable nozzle map, and/or between successive print passes when checking the vulnerable nozzles.

Figure 9:
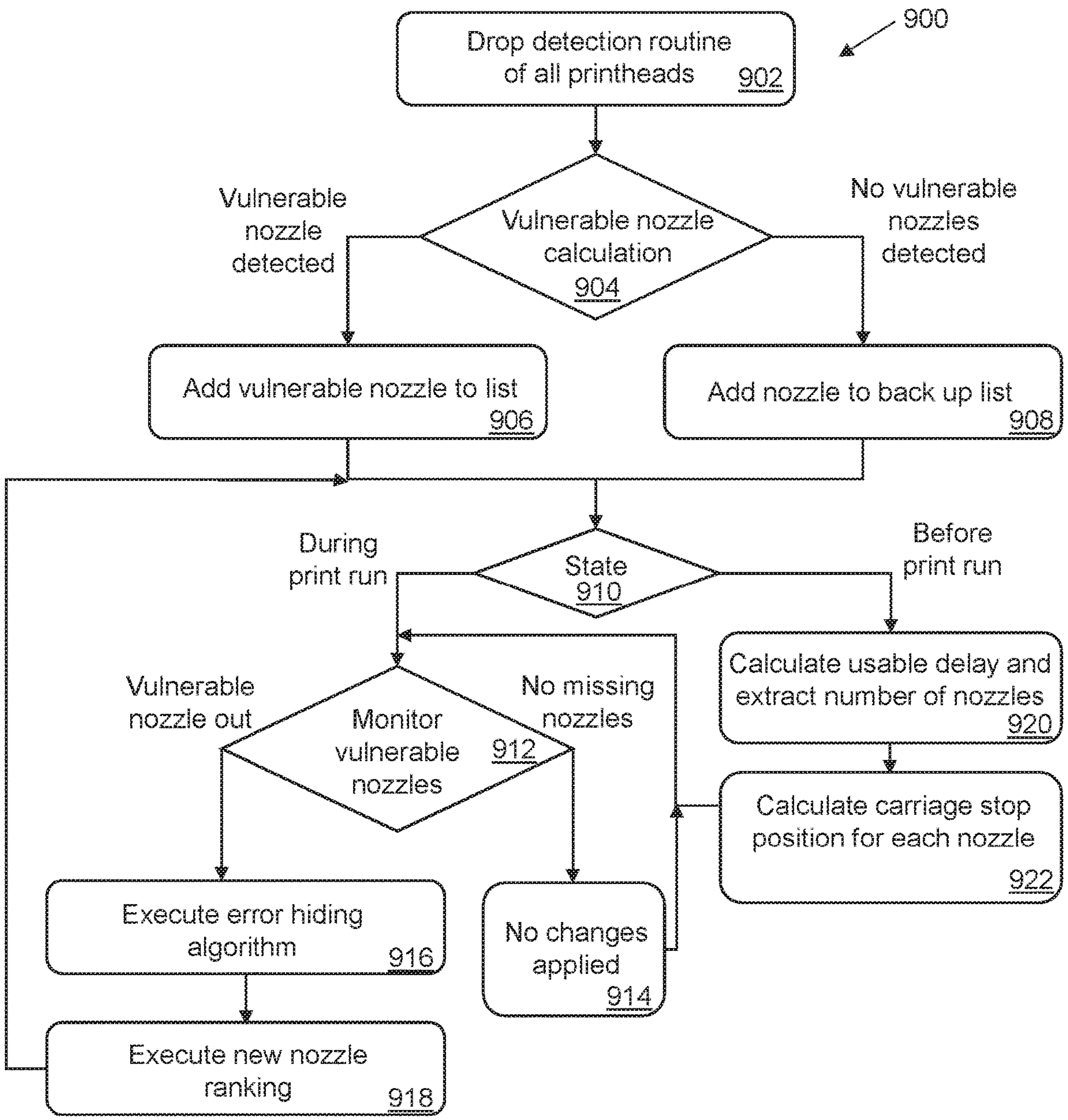
FIG. 9 depicts a method for monitoring printhead nozzles according to some examples.

FIG. 9 illustrates an example overall methodology 900. This method includes one or more above-discussed methods. Initially, in this example, a drop detection routine of all printheads is performed 902 to identify functional and non-functional nozzles. Using the results of this routine 902, the vulnerable nozzles are calculated 904. If a nozzle is determined to be vulnerable then it is added to the vulnerable nozzle list 906 (which may be a vulnerable nozzle map; a map may be considered to be a spatially organised list). If a nozzle is determined to be not vulnerable (but functioning) then it is added to a back-up nozzle list 908. Such a back-up list may be used, for example, if there is time, between successive print passes, to check the operation of more nozzles than those listed in the vulnerable nozzle map. These actions may be performed prior to starting the print run in a pre-print run check of nozzle health and to provide an initial vulnerable nozzle map/list.

The state of the printing process is checked 910. If the process is prior to the print run, following generation of the initial vulnerable nozzle map/list 906, the useable delay between successive print runs may be calculated and the number of nozzles which may be checked in that time may be extracted 920, as discussed in relation to FIG. 7. The carriage stop position for checking those nozzles (or a, or each, subset of those nozzles) may also be calculated 922.

If the process is during the print run, the operation of the one or more vulnerable nozzles identified in the vulnerable nozzle map/list is monitored 912, as described above e.g. through drop detection between successive print runs. If no (further) nozzles are identified as being non-functional/missing, then no changes are applied 914 and the process continues by monitoring the vulnerable nozzles 912. If a vulnerable nozzle is identified as being non-functional/missing/out, then in this example an error hiding algorithm is executed 916 to compensate for the non-functional nozzle to ensure an acceptable print quality is still achieved. A new nozzle ranking 918 is obtained, to specify which nozzles are to be operated and which nozzles are now considered to be vulnerable and are to be monitored 912, following execution of the error hiding algorithm 916. The process continues by checking the state 910 of the print run.

Also disclosed herein is an apparatus (e.g. the apparatus 1000 of FIG. 10) which may perform any of the methods disclosed herein. Such an apparatus may comprise a processor 1002 and a computer readable storage 1004 coupled to the processor 1002; and an instruction set to cooperate with the processor 1002 and the computer readable storage 1004, wherein the instruction set is to perform any of the methods disclosed herein.

Figure 10:
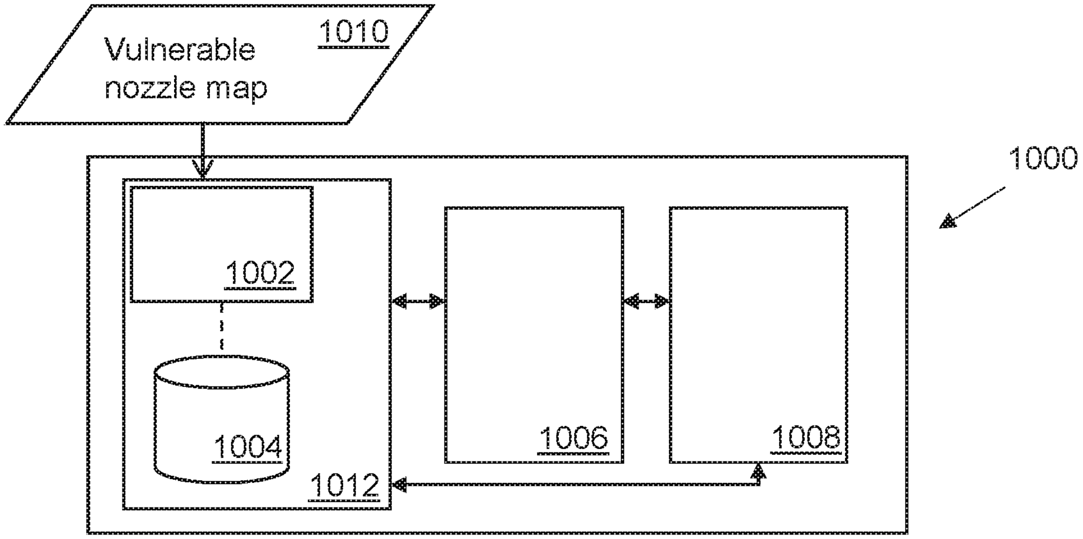
FIG. 10 illustrates an apparatus according to some examples.

FIG. 10 illustrates an apparatus 1000 comprising: a printhead 1006 comprising a plurality of nozzles; a drop detection element 1008 to determine the operation of a printhead nozzle; and a controller 1012. The controller 1012 is to, in a print job, and based on a vulnerable nozzle map 1010 indicating one or more operational nozzles of the printhead 1006 identified as meeting a failure likelihood criterion, control the printhead 1006 to perform a print pass; control the printhead 1006 and drop detection element 1008 to check operation of the one or more operational nozzles indicated on the vulnerable nozzle map 1010; and control the printhead 1006 to perform a further print pass of the printhead 1006.

In some examples, as illustrated, the vulnerable nozzle map 1010 may be stored remotely from the controller 1012 (and/or apparatus 1000) and accessed by the controller 1012, for example over wired or wireless connection. In some examples, the apparatus 1000 comprises a storage medium 1004 on which the vulnerable nozzle map is stored. In either arrangement, the controller 1012 may, following the print pass and check of the operation of the one or more operational nozzles indicated on the vulnerable nozzle map 1010, identify one or more further operational nozzles which meet the failure likelihood criterion; update the vulnerable nozzle map 1010 to include the one or more identified further operational nozzles. The controller may store the updated vulnerable nozzle map on the storage medium 1012 (either which is part of the apparatus 1000 or in communication with and external to the apparatus 1000).

Figure 11:
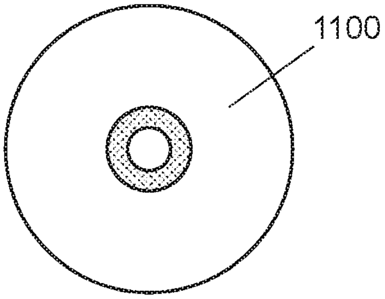
FIG. 11 illustrates a computer readable medium according to some examples.

FIG. 11 illustrates a (e.g. non-transitory) computer readable storage medium 1000 having executable instructions stored thereon. FIG. 11 may be considered to show a computer readable storage medium having executable instructions stored thereon which, when executed by a processor, cause the processor to perform any method disclosed herein. The machine readable storage 1100 can be realised using any type or volatile or non-volatile (non-transitory) storage such as, for example, memory, a ROM, RAM, EEPROM, optical storage and the like.

In some examples, when executed by a processor, the instructions stored on the medium 1100 are to cause the processor to 1012, during a print job, to provide a vulnerable nozzle map 1010 indicating one or more operational nozzles of a printhead identified as meeting a failure likelihood criterion; and between successive print passes of the print job, control a drop detection process to check operation of the one or more operational nozzles indicated on the vulnerable nozzle map.

The non-transitory computer readable storage medium may, in some examples, have executable instructions stored thereon which, when executed by a processor, cause the processor to: update the vulnerable nozzle map based on a change in operation of the one or more operational nozzles indicated on the vulnerable nozzle map; and re-determining an error-hiding algorithm based on the updated vulnerable nozzle map, the error-hiding algorithm to select printing nozzles to provide a reduction of printing errors due to non-functional nozzles.

In discussing "checking" the operation of nozzles in successive print passes, in some examples this may mean that checks are performed between immediately successive print passes (i.e. the printhead performs one print pass, then a check of the operation of vulnerable nozzles is performed, then the printhead performs a further print pass, and then a further check of the operation of (the same, or different) vulnerable nozzles is performed. In some examples this may mean that checks are performed between successive print passes but not as frequently as between every print pass. For example, the printhead may perform one print pass, then a second print pass, and then a check of the operation of vulnerable nozzles is performed, followed by a third and a fourth print pass, and then a further check of the operation of (the same, or different) vulnerable nozzles is performed (i.e. in this example a check of vulnerable nozzles is performed between each two immediately successive print passes). In other examples there may be a different number of print passes between vulnerable nozzle checks.

In some examples, the number of print passes between successive checks of the vulnerable nozzles may vary as the print job progresses; for example, as the print job progresses, the number of print passes between successive vulnerable nozzle checks may decrease (in other examples the number of print passes may increase, or may otherwise vary). In some examples, the frequency with which vulnerable nozzle checks are performed (i.e. the number of print passes taking place before a vulnerable nozzle check is performed) may vary depending on a printing factor, such as a quality of the image being printed (e.g. amount of ink to print a region of the image, saturation of the ink to be used in a region of the image) and/or an indication obtained from the vulnerable nozzle checks (for example, if the vulnerable nozzle checks identify an increasing number of vulnerable nozzles as the print job progresses, the frequency with which vulnerable nozzle checks are performed may also increase). Of course other variations on the frequency of vulnerable nozzle checks are possible.

Because the vulnerable nozzle monitoring is being executed during printing, with no throughput impact, the process can be done using a reduced amount of drop detection actions compared to monitoring routines which take place offline.

Throughout the description and claims of this specification, the words "comprise" and "contain" and variations of them mean "including but not limited to", and they are not intended to (and do not) exclude other components, integers or elements, Throughout the description and claims of this specification, the singular encompasses the plural unless the context suggests otherwise. In particular, where the indefinite article is used, the specification is to be understood as contemplating plurality as well as singularity, unless the context suggests otherwise.

The invention claimed is:

1. A computer implemented method comprising:
- based on a vulnerable nozzle map indicating one or more operational nozzles of a printhead identified as meeting a failure likelihood criterion,
- during a print job and between successive print passes of the printhead in the print job,
- checking operation of the one or more operational nozzles indicated on the vulnerable nozzle map;
- wherein checking the operation of the one or more operational nozzles indicated on the vulnerable nozzle map and selecting nozzles by an error-hiding algorithm to provide a reduction of printing errors is performed such that the print job with checking the operation of one or more operational nozzles and selecting nozzles by an error-hiding algorithm takes substantially the same time as performing the print job without checking the operation of one or more operational nozzles.

2. The computer implemented method of claim 1, following checking the operation of the one or more operational nozzles, comprising:
- identifying one or more further operational nozzles of the printhead which meet the failure likelihood criterion; and
- adding the further operational nozzles to the vulnerable nozzle map.

3. The computer implemented method of claim 2, comprising:
- re-determining the error-hiding algorithm based on the vulnerable nozzle map including the added further operational nozzles, the error-hiding algorithm to select nozzles to provide a reduction of printing errors due to non-functional nozzles.

4. The computer implemented method of claim 1, wherein the failure likelihood criterion of an operational nozzle comprises one or more of the nozzle:
- if non-operational, causing a visible fault in a printed image;
- immediately neighbouring a threshold number of non-functional nozzles; and
- failing to operate at a rate above a threshold nozzle operation rate.

5. The computer implemented method of claim 1, wherein the printhead comprises a plurality of nozzle regions, and wherein checking the operation of the one or more operational nozzles identified as meeting the failure likelihood criterion comprises:
- checking operational nozzles of one of the nozzle regions between successive print passes of the printhead; and
- checking operational nozzles of a different one of the nozzle regions between further successive print passes of the printhead.

6. The computer implemented method of claim 1, comprising generating the vulnerable nozzle map by:
- checking operation of the nozzles of the printhead prior to the print job;
- based on the checked operation of the nozzles, assigning each nozzle as:
- operational, whereby the nozzle ejects printing fluid and does not meet the failure likelihood criterion;
- vulnerable, whereby the nozzle ejects printing fluid and meets the failure likelihood criterion: or
- non-functional, wherein the nozzle does not eject printing fluid; and
- recording the assignment of each nozzle in the vulnerable nozzle map.

7. The computer implemented method of claim 1, wherein the operation of the one or more operational nozzles indicated on the vulnerable nozzle map is checked using a drop detection apparatus when the printhead is at a carriage stop position at a side of a print zone.

8. A computer implemented method, comprising:
- based on a vulnerable nozzle map indicating one or more operational nozzles of a printhead identified as meeting a failure likelihood criterion,
- during a print job and between successive print passes of the printhead in the print job, checking operation of the one or more operational nozzles indicated on the vulnerable nozzle map;
- determining a number per print pass of vulnerable nozzles of which operation can be checked based on a time to check operation of one vulnerable nozzle and a time available between successive print passes; and determining a number of vulnerable nozzles of which the operation is to be checked.

9. The computer implemented method of claim 8, wherein:

if the number of vulnerable nozzles is greater than the number per print pass of vulnerable nozzles:

checking a first portion of the vulnerable nozzles in a first print pass, wherein the number of vulnerable nozzles in the first portion does not exceed the number per print pass of vulnerable nozzles; and checking one or more further portions of the vulnerable nozzles in one or more corresponding further print passes, wherein the number of vulnerable nozzles in the each of one or more further portions do not exceed the number per print pass of vulnerable nozzles.

10. The computer implemented method of claim 8, wherein:

if the number of vulnerable nozzles is less than the number per print pass of vulnerable nozzles, checking a second number of one or more operational nozzles of the printhead identified as meeting a further failure likelihood criterion which is lower than the failure likelihood criterion.

11. An apparatus comprising:

a printhead comprising a plurality of nozzles;

a drop detection element to determine the operation of a printhead nozzle; and a controller to, in a print job, and based on a vulnerable nozzle map indicating one or more operational nozzles of the printhead identified as meeting a failure likelihood criterion, control the printhead to perform a print pass;

control the printhead and drop detection element to check operation of the one or more operational nozzles indicated on the vulnerable nozzle map after the print pass; and control the printhead to perform a further print pass of the printhead in the print job;

wherein checking operation of one or more operational nozzles on the vulnerable nozzle map and selecting nozzles by an error-hiding algorithm to provide a reduction of printing errors is performed such that the print job with checking operation of one or more operational nozzles and selecting nozzles by an error-hiding algorithm takes substantially the same time as performing the print job without checking the operation of one or more operational nozzles.

12. The apparatus of claim 11, comprising a storage medium on which the vulnerable nozzle map is stored, wherein the controller is to:

following the print pass and check of the operation of the one or more operational nozzles indicated on the vulnerable nozzle map, identify one or more further operational nozzles which meet the failure likelihood criterion; and update the vulnerable nozzle map to include the one or more identified further operational nozzles; and store the updated vulnerable nozzle map on the storage medium.

13. A non-transitory computer readable storage medium having executable instructions stored thereon which, when executed by a processor, cause the processor to, during a print job:

provide a vulnerable nozzle map indicating one or more operational nozzles of a printhead identified as meeting a failure likelihood criterion; and between successive print passes in the print job, control a drop detection process to check operation of the one or more operational nozzles indicated on the vulnerable nozzle map;

wherein the drop detection process to check operation of the one or more operational nozzles on the vulnerable nozzle map and selecting nozzles by an error-hiding algorithm to provide a reduction of printing errors is performed such that the print job with the drop detection process to check operation of one or more operational nozzles and selecting nozzles by an error-hiding algorithm takes substantially the same time as performing the print job without the drop detection process.

14. The non-transitory computer readable storage medium of claim 13, having executable instructions stored thereon which, when executed by a processor, cause the processor to:

update the vulnerable nozzle map based on a change in operation of the one or more operational nozzles indicated on the vulnerable nozzle map; and re-determining the error-hiding algorithm based on the updated vulnerable nozzle map, the error-hiding algorithm to select printing nozzles to provide a reduction of printing errors due to non-functional nozzles.

* * * * *